(12) United States Patent
Morelock et al.

(10) Patent No.: US 11,439,275 B2
(45) Date of Patent: *Sep. 13, 2022

(54) BARBECUE GRILL AND SMOKER

(71) Applicant: Portable Kitchens, Inc., Little Rock, AR (US)

(72) Inventors: David Morelock, Escondido, CA (US); Brian Taylor, Little Rock, AR (US); Jeff Humiston, Little Rock, AR (US); Scott Moody, Little Rock, AR (US); Paul James, Little Rock, AR (US); Martha James, Little Rock, AR (US)

(73) Assignee: Portable Kitchens, Inc., Little Rock, AR (US)

( * ) Notice: Subject to any disclaimer, the term of this patent is extended or adjusted under 35 U.S.C. 154(b) by 482 days.

This patent is subject to a terminal disclaimer.

(21) Appl. No.: 16/529,387

(22) Filed: Aug. 1, 2019

(65) Prior Publication Data
US 2019/0350409 A1  Nov. 21, 2019

Related U.S. Application Data

(63) Continuation of application No. 15/064,471, filed on Mar. 8, 2016, now Pat. No. 10,413,124.

(51) Int. Cl.
A47J 37/07 (2006.01)

(52) U.S. Cl.
CPC ....... *A47J 37/0763* (2013.01); *A47J 37/0713* (2013.01); *A47J 2201/00* (2013.01)

(58) Field of Classification Search
CPC . A47J 37/0763; A47J 37/0713; A47J 2201/00
See application file for complete search history.

(56) References Cited

U.S. PATENT DOCUMENTS

| 4,043,312 | A  | * | 8/1977  | Kern     | A47J 37/0713 126/41 R |
| 5,016,607 | A  | * | 5/1991  | Doolittle | A47J 37/0786 126/41 R |
| 10,413,124 | B2 | * | 9/2019  | Morelock | A47J 37/0763 |
| 2010/0252021 | A1 | * | 10/2010 | Bryce    | A47J 37/0786 126/1 R |

* cited by examiner

*Primary Examiner* — Alfred Basichas

(57) ABSTRACT

A charcoal-fueled barbecue grill and smoker includes a duct system with "volcanoes" on the inside of the lower grill chamber that match holes in a tube fitted to the lower grill chamber, such that a turning of the tube provides precise venting and temperature control during cooking. A rear stabilizer attached to the lower grill chamber allows the grill to be used either with or without a stand, preventing the grill from toppling over when the lid is opened. The grill may include one or more removable shelves. An ash evacuation system includes a frusto-conical ash bucket that attaches at a hole in the lower grill chamber and held in place by the rear stabilizer using an ash bucket hanger.

20 Claims, 7 Drawing Sheets

BARBECUE GRILL AND SMOKER

CROSS-REFERENCE TO RELATED APPLICATIONS

This application is a continuation of U.S. patent application Ser. No. 15/064,471, entitled "Barbecue Grill and Smoker," filed on Mar. 8, 2016. Such application is incorporated herein by reference in its entirety.

BACKGROUND OF THE INVENTION

The field of the invention is barbecue grills and smokers for cooking, and in particular charcoal-fueled barbecue grills and smokers.

Outdoor grilling has long been a popular method of cooking meats and other foods due to the desirable flavors that are developed by this cooking method. The development of the modern charcoal briquette in the early twentieth century led to the widespread production of charcoal-fueled grills intended for personal use. Gas-fueled grills, which were first mass produced in the 1950's, compete with charcoal-fueled grills in the modern marketplace. Many gas-fueled grills are powered by the burning of propane from a small adjacent tank, although others use natural gas and are connected to natural gas lines. Although gas-fueled grills are popular due to ease of lighting and use, many barbecue enthusiasts believe that charcoal-fueled grills produce foods with a more desirable taste due to the unique smoke flavors imparted to the food during cooking.

Charcoal-fueled grills come in many sizes and shapes. The simplest are merely pans made of sheet metal to receive the charcoal, with a wire cooking grid placed above the pan and a support stand. Most grills include a lid to hold in smoke and help prevent "flare-ups" from grease dripping onto the charcoal, and many include vents that may be opened or closed to varying degrees in order to control the burn rate of the charcoal, and thus control the cooking temperature within the grill.

Although many types of charcoal-fueled barbecue grills are available, they generally remain less convenient to use than gas-fueled grills, and the cooking or smoking of food in these grills remains more difficult to control than with gas-fueled grills. A charcoal-fueled grill that combines the ease of use and controllability of gas grills with the desirable flavor characteristics of a charcoal-fueled grill would thus be highly desirable.

BRIEF SUMMARY OF THE INVENTION

The present invention is directed to an improved charcoal-fueled barbecue grill and smoker that presents numerous advantages over prior art grills. The invention provides precise venting and temperature control that simplifies and optimizes low-and-slow cooking, hot-and-fast cooking, and dual-zone cooking in a way that is unique and superior to other charcoal or gas barbecue grills.

In certain embodiments, a duct system includes "volcanoes" on the inside of the lower grill chamber that match holes in one or more tubes fitted at the bottom of the lower grill chamber, such that a simple turning of the tubes provides precise venting and temperature control during cooking. Covers fitted over the volcanoes prevent ash, soot, grease, and the like from falling into the volcanoes during use, and thereby impeding the flow of air through the tubes.

In certain embodiments, a rear stabilizer attached to the lower grill chamber allows the grill to be used either with or without a stand, preventing the grill from toppling over when the lid is opened, and also may provide a convenient location to hang shelves when not attached horizontally to the grill.

In certain embodiments, an ash evacuation system includes a frusto-conical ash bucket that attaches at a hole in the lower grill chamber. The ash bucket may be held in place by the rear stabilizer using an ash bucket hanger, and thus the rear stabilizer feature of the invention provides an additional function. A removable cover inside the lower grill chamber covers the hole in the lower grill chamber leading to the ash bucket when the grill is in use for cooking.

In certain embodiments, the invention includes a quick-release shelving system that allows for multiple shelf configurations, including, for example, the connection of multiple grills together in a "daisy chain" fashion by means of the various interchangeable shelving components.

In certain embodiments, the lower grill chamber includes a quick-release mechanism to easily and conveniently detach the grill chamber from the stand for transportation or storage. Certain embodiments may also include an alternative portable stand, which includes a folding mechanism for the legs to facilitate transportation and storage of this stand. This allows for convenient use of the grill when, for example, on camping outings or "tailgating" events. Alternatively, in certain embodiments the grill may be used without a stand, such as by placing it on a non-flammable surface such as a concrete picnic table as commonly found in public parks, with the lower grill chamber being made stable by the tube supports of the lower grill chamber and the rear stabilizers.

In certain embodiments, the invention features a pair of upper vents in the upper grill chamber that are positioned over the tube-controlled vents in the lower chamber, thereby providing a dual-zone cooking functionality for the grill.

In certain embodiments, the upper grill chamber may further be raised and lowered during cooking, or removed entirely if desired to cook in a manner more similar to a simple brazier-type grill. This allows for easy access to control the quantity and quality of the charcoal heating.

It may be seen that these design features of the present invention, as presented in the various disclosed embodiments, bring much of the convenience of gas-fueled grills to a charcoal-fueled grill. In addition, the modular nature of certain embodiments of the invention allows for use of the grill in a multitude of configurations and in many different locations and at various events. These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
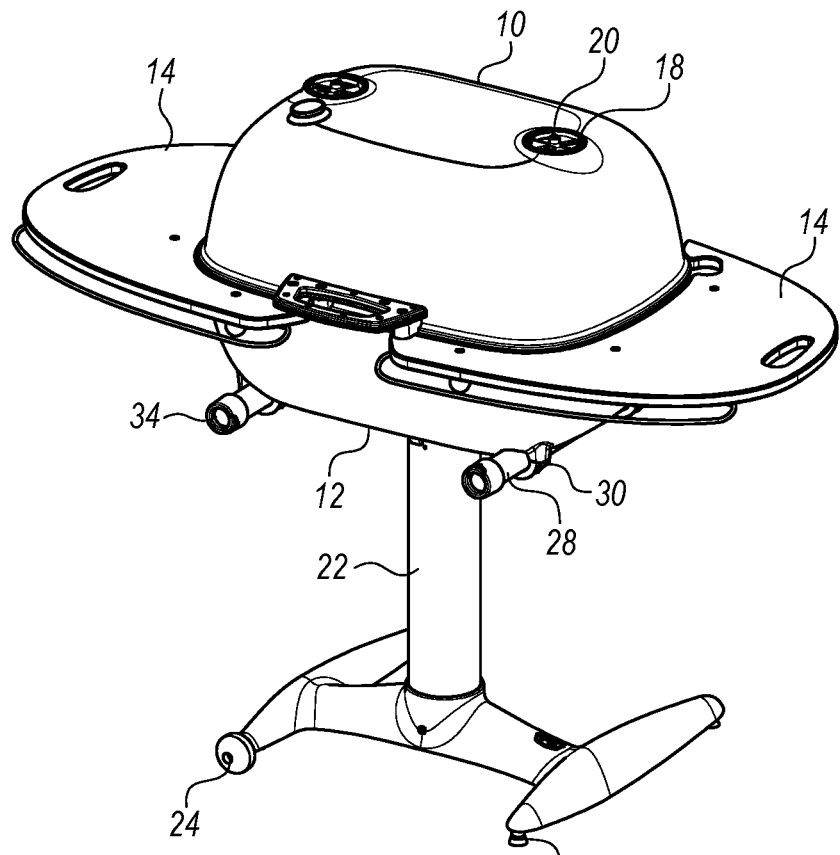
FIG. 1 is a perspective view of an embodiment of the present invention.
Figure 2:
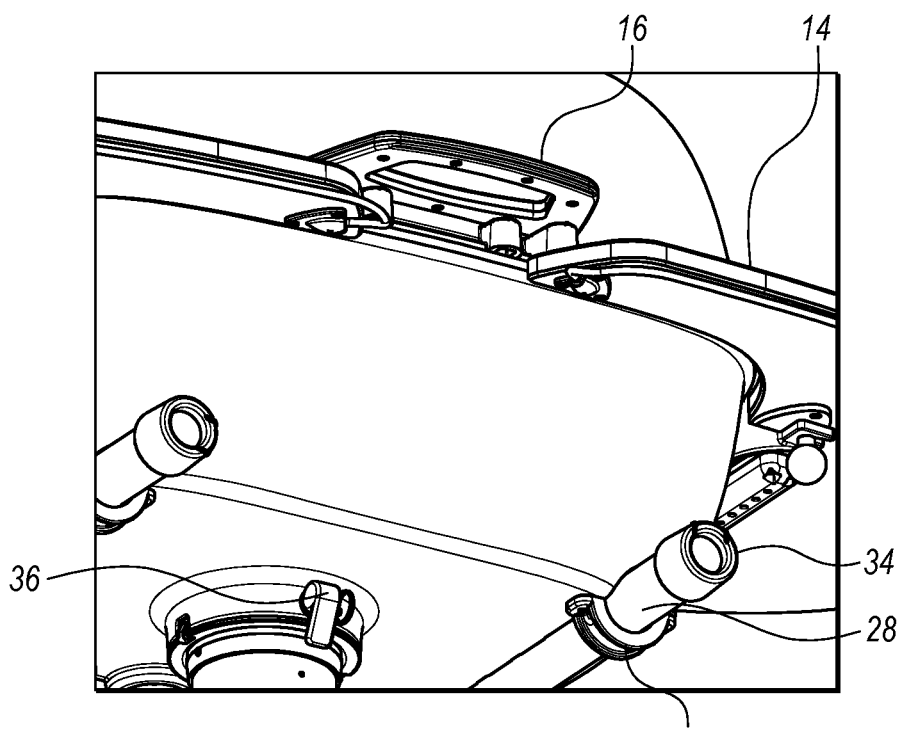
FIG. 2 is a detail perspective view of the underside of an embodiment of the present invention.

Referring now to FIGS. 1 and 2, an embodiment of the invention may now be described. The grill or smoker (referred to hereinafter simply as a grill, although it could be used for either purpose) is composed of an upper grill chamber 10 and lower grill chamber 12 that fit together to provide a closed interior space. In certain embodiments, upper grill chamber 10 and lower grill chamber 12 may be constructed of cast aluminum, in order to prevent rust or corrosion of these grill parts and provide more even heating. Because of its high conductivity, a thick aluminum construction provides for even heating within the chamber. Other metals and materials capable of withstanding the heat developed within a charcoal grill may, however, be employed in alternative embodiments.

Figure 7:
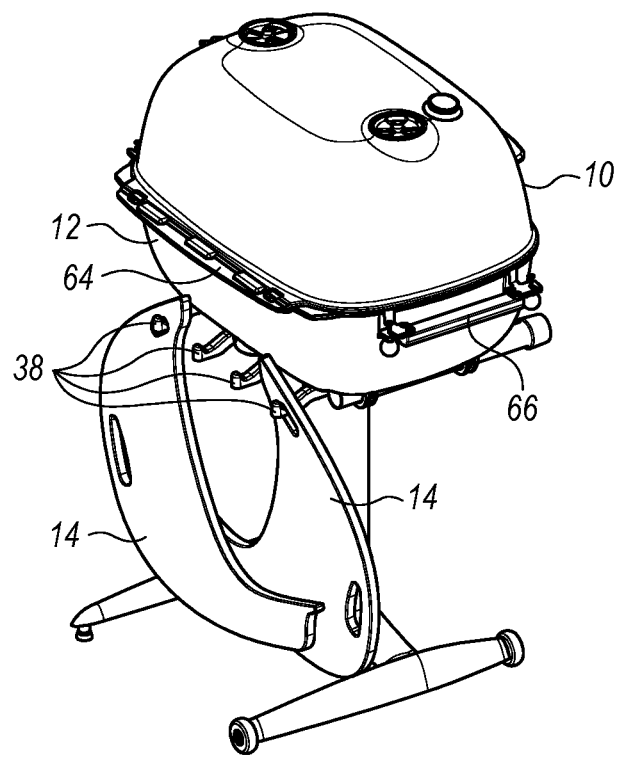
FIG. 7 is a perspective view of an embodiment of the invention with shelves removed and stored at the rear stabilizer.

A handle 16 is provided to allow the grill to be opened by pulling up on handle 16, thereby pivoting upper grill chamber 10 away from lower grill chamber 12 at hinge 64 (see FIG. 7 showing the rear view of grill with hinge 64). In this way, convenient access is gained to the interior of the grill in order to place charcoal within the grill, and to perform various operations during cooking or smoking while using the grill. Preferably, upper grill chamber 10 may be pivoted more than 90° so that it will remain open due to gravity without the user being required to hold it open during use. Handle 16 may be constructed of a plastic or rubber material, or any other material that is thermally insulative to protect the user's hand from heat during opening of the grill. Hinge 64 may be molded as an integral portion of upper grill chamber 10 and lower grill chamber 12, such that mating portions of these two pieces come together to form hinge 64. Preferably, these are formed as shown in FIG. 7 so that upper grill chamber 10 is easily removable from lower grill chamber 12 for cleaning or maintenance.

In certain embodiments, the grill is supported by tubular stand 22. Tubular stand 22 is attached to a base with horizontally extending H-shaped "legs" to provide a firm support for the grill and thereby prevent tipping, which would be highly dangerous for the user of this type of device. For ease of movement, stand wheels 24 may be employed on one of the two legs of tubular stand 22, with stand feet 26 on the other leg to prevent inadvertent movement of the grill. Stand feet 26 may be composed of rubber or other material that provides a solid grip. It may be seen that the grill may be moved on stand wheels 24 by gently tipping the grill in the direction of stand wheels 24 so that stand feet 26 disengage from the surface upon which the grill is placed, thereby allowing wheeled movement of the grill to any desired location. Tubular stand 22 is removably locked into lower grill chamber 12 by stand lock 36 (see FIG. 2). Stand lock 36 may include a pin that fits through mating holes in lower grill chamber 12 and tubular stand 22.

Shelves 14 are attached at one or both sides of lower grill chamber 12. Shelves 14 are preferably attached in a removable fashion to protrusions extending from lower grill chamber 12 (see FIG. 2). Shelves 14 provide a convenient location for the placement of cooking utensils or plates holding foods to be cooked or smoked on the grill. Shelves 14 may include extending metal bars for hanging tools, and may have handles molded into them (as shown in FIG. 1) for convenience of removal and replacement. In certain embodiments, the extending metal bars may be used to attach pouches, baskets, or the like (not shown) for holding various tools and accessories used while grilling.

Figure 5:
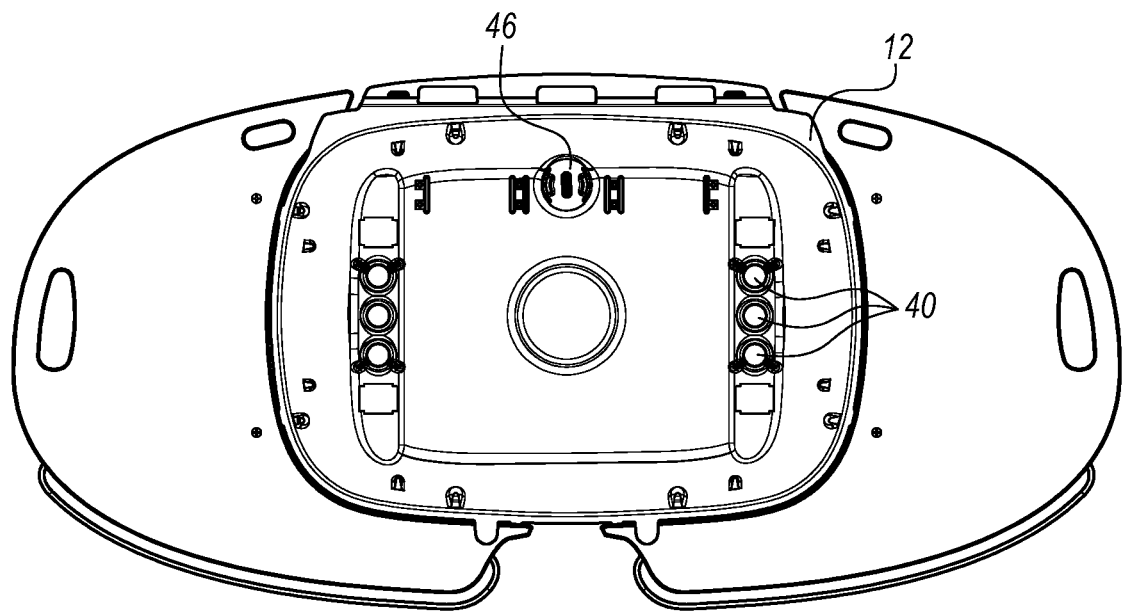
FIG. 5 is a top plan view of the inside of the lower grill chamber of an embodiment of the present invention when the grating and "volcano" covers removed.

Venting for the grill is provided through vent tubes 28 at the bottom, and upper vent holes 18 at the top. As shown in FIG. 5, lower grill chamber 12 is molded with tubular indentations to receive vent tubes 28 beneath lower grill chamber 12 and held in place with vent tube brackets 30 (see FIG. 2). Vent tube brackets 30 may be integrally molded into lower grill chamber 12, or formed as separate parts and bolted or otherwise attached to lower grill chamber 12. The "volcanoes" 40 are openings in the bottom of lower grill chamber 12 that allow for air to flow through the bottom portion of the grill and through matching vent tube holes 32 in vent tubes 28. It may be seen that be turning vent tubes 28, the alignment between vent tube holes 32 and volcanoes 40 may be changed. When completely aligned, maximum air flow is allowed through lower grill chamber 12. When turned 180 degrees from this position, no air is allowed to flow through vent tubes 28 and into the grill. At positions between these two extreme positions, more or less air may be allowed to flow. Thus the user is able to precisely control air flow through the bottom of the grill by simply turning one or both of vent tubes 28. Air flow may be varied between the right and left sides of the grill by turning the two vent tubes 28 to different positions, thereby providing different heating parameters to these two sections of the grill. This may be desirable when two different foods are being cooked simultaneously. Vent tube grips 34, preferably formed of rubber or plastic or another thermally insulating material, are fitted over the ends of vent tubes 28 to prevent the user from burning his or her hand while turning vent tubes 28 during operation of the grill. Although three volcanoes 40 and vent tube holes 32 are shown in the illustrations, any number could be used in alternative embodiments of the invention.

Figure 3:
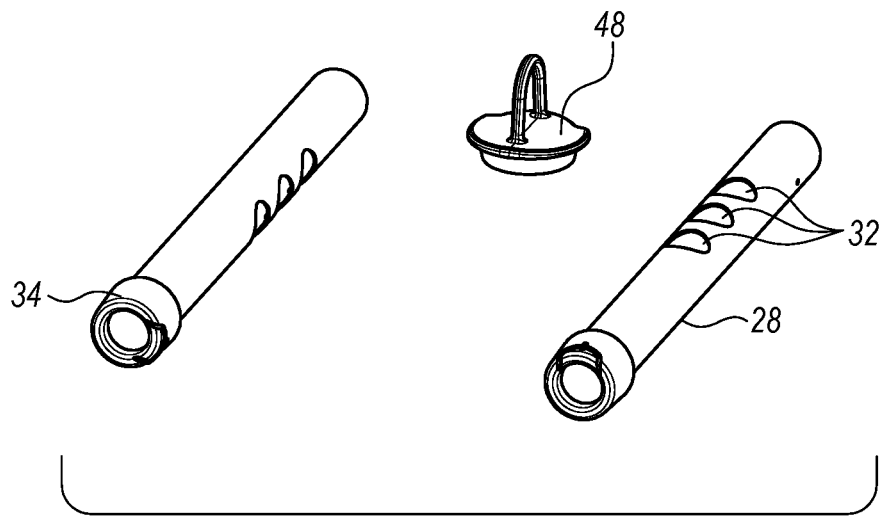
FIG. 3 is a perspective view of the airflow tubes and ash hole cover from an embodiment of the present invention.
Figure 6:
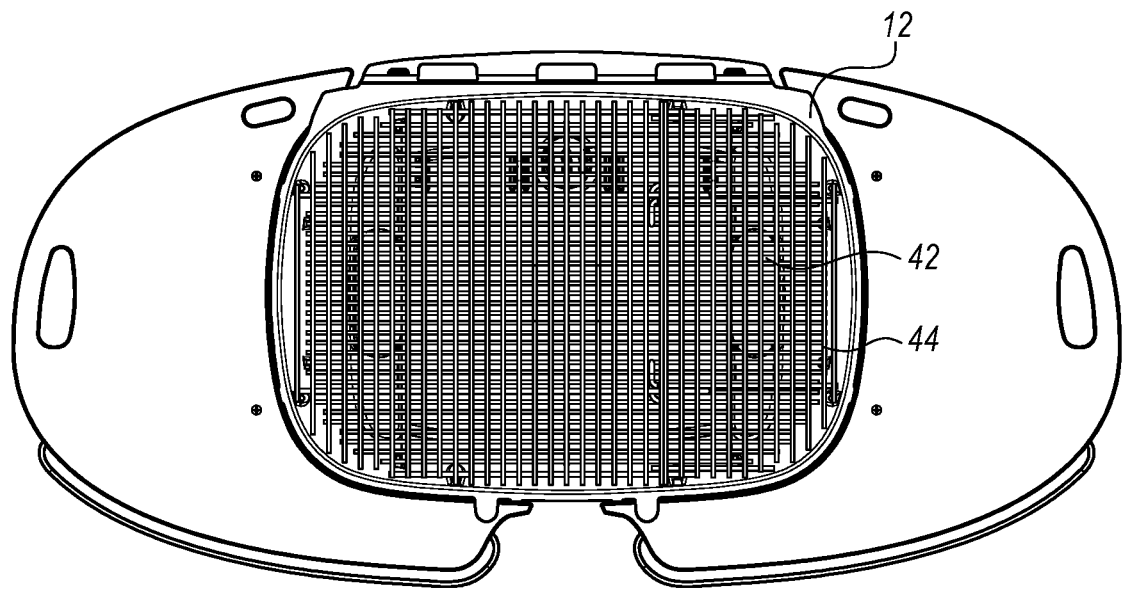
FIG. 6 is a top plan view of the inside of the lower grill chamber of an embodiment of the present invention including the grating and "volcano" covers.

FIG. 6 illustrates volcano covers 42 in place in lower grill chamber 12, along with grate 44 that is used to hold charcoal. The purpose of volcano covers 42 is to prevent ash, soot, grease, and the like from falling into volcanoes 40 during use, and thereby impeding the flow of air through vent tubes 28. FIG. 5 illustrates ash hole 46, which allows for the removal of ash from the grill. Ash hole cover 48, shown in FIG. 3 and positioned within lower grill chamber 12 as shown in FIG. 6, is fitted into place at all times other than when ash is being removed, in order to prevent charcoal from falling through during use of the grill, as well as to prevent unwanted air from entering the grill chamber.

Air flow through upper grill chamber 10 is controlled by upper vent plates 20 at upper vent holes 18, as shown in FIG. 1. Upper vent plates 20 are generally circular, with cut out sectors that allow for air flow when the cut-out sectors are turned to match the openings of upper vent holes 18. The operation of this type of vent is thus similar to openings commonly used on packaging for spices, parmesan cheese, and the like to control the rate at which material is dispensed from the packaging. The combination of precisely controlling airflow through lower grill chamber 12 with vent tubes 28 and through upper grill chamber 10 with upper vent plates 20 allows for very fine adjustments to the airflow through the grill during cooking. In addition, the air flow at the right side of the grill may be controlled independently from the flow at the left side, and thus two different cooking environments may be maintained for different foods being cooked simultaneously. In alternative embodiments, any number of vent tubes 28 and/or upper vent plates 18 could be employed, thereby creating any number of independently controllable cooking zones within the grill.

Figure 4:
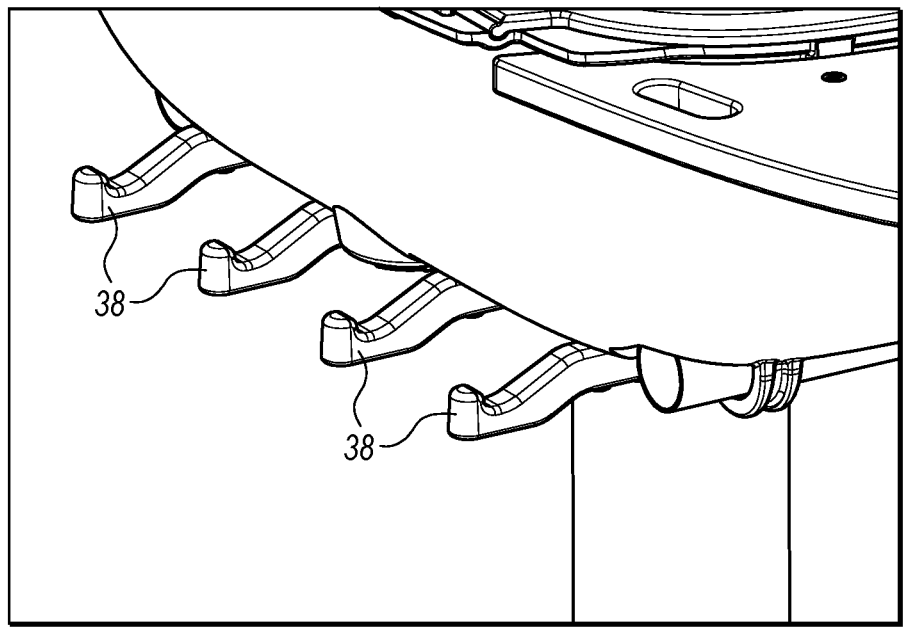
FIG. 4 is a detail perspective view of the rear stabilizer of an embodiment of the present invention.
Figure 12:
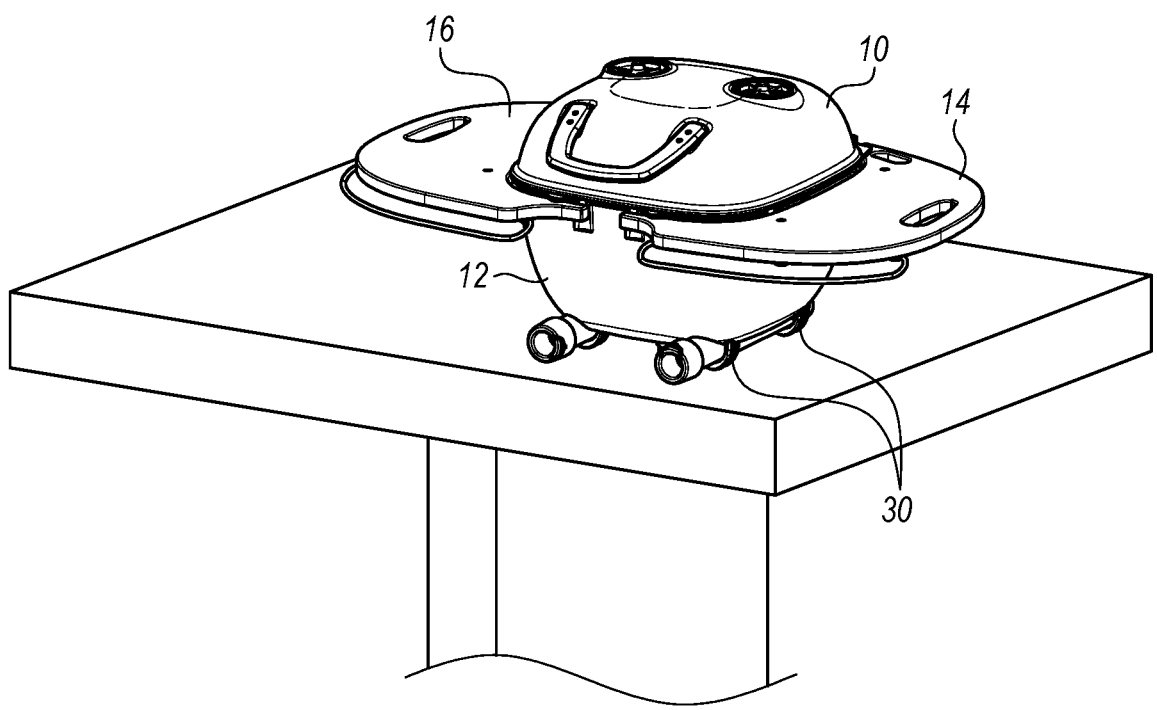
FIG. 12 is a perspective view of a portable grill positioned on a flat surface without using a stand according to an embodiment of the present invention.
Figure 13:
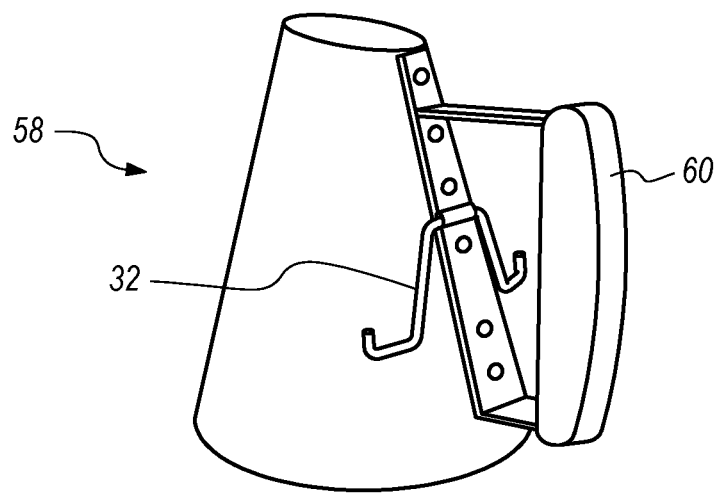
FIG. 13 is a perspective view of a frusto-conical ash bucket according to an embodiment of the present invention.
Figure 14:
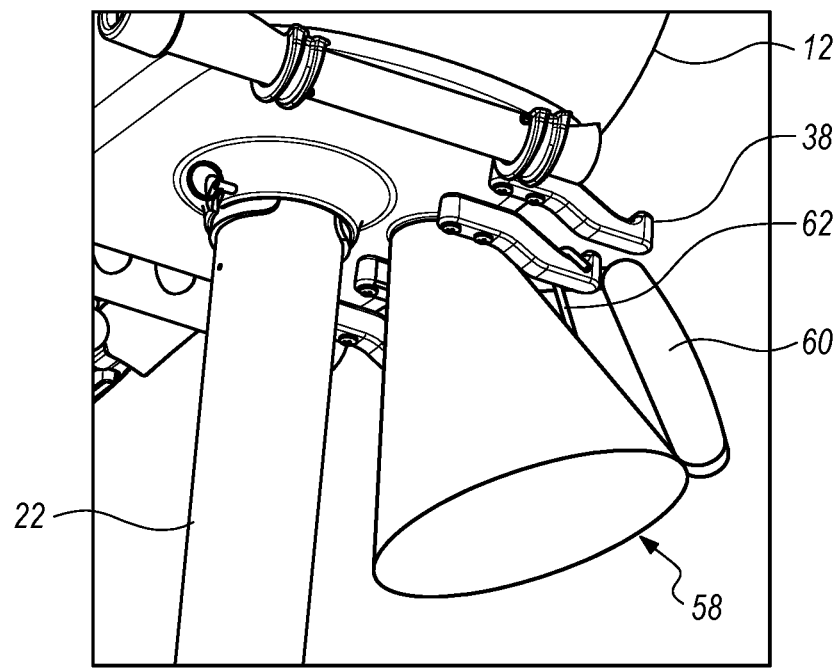
FIG. 14 is a perspective view of a frusto-conical ash bucket attached at the ash hole on the lower grill chamber according to an embodiment of the present invention.

FIG. 4 illustrates rear stabilizer bars 38 in an embodiment of the invention. Rear stabilizer bars 38 serve multiple functions. If the user desires to use the grill without tubular stand 22, such as by placing it on a concrete picnic table as commonly found in public parks and as illustrated in FIG. 12, rear stabilizer bars 38 prevent the grill from tipping over when upper grill chamber 10 is opened using handle 16. In addition, and as illustrated in FIG. 7, rear stabilizer bars 38 provide a convenient location for hanging removable shelves 14 when their use is not desired, such as when space around the grill is limited or for storage. Finally, rear stabilizer bars 38 can be used to hold ash bucket 58 (shown in FIGS. 13 and 14) in place for convenient removal of ash and soot from the grill. Ash bucket 58 is preferably of a frusto-conical shape, with an opening at the top that mates with ash hole 46. Ash bucket hanger 62 of ash bucket 58 attaches to rear stabilizer bars 38 to hold ash bucket 58 locked into position just beneath and aligned with ash hole 46. With ash hole cover 48 removed, ash and soot can then be conveniently swept into ash bucket 58 without the user being required to simultaneously sweep ash into ash bucket 58 and hold ash bucket 58 in place. Once the ash and soot are cleared from the grill, ash bucket 58 can be removed by lifting ash bucket hanger 62 off of rear stabilizer bars 38, and ash hole cover 48 may be returned to its position covering ash hole 46 so that the grill is again ready for use. Ash bucket 58 may then be conveniently used to transport the ashes for disposal.

Figure 8:
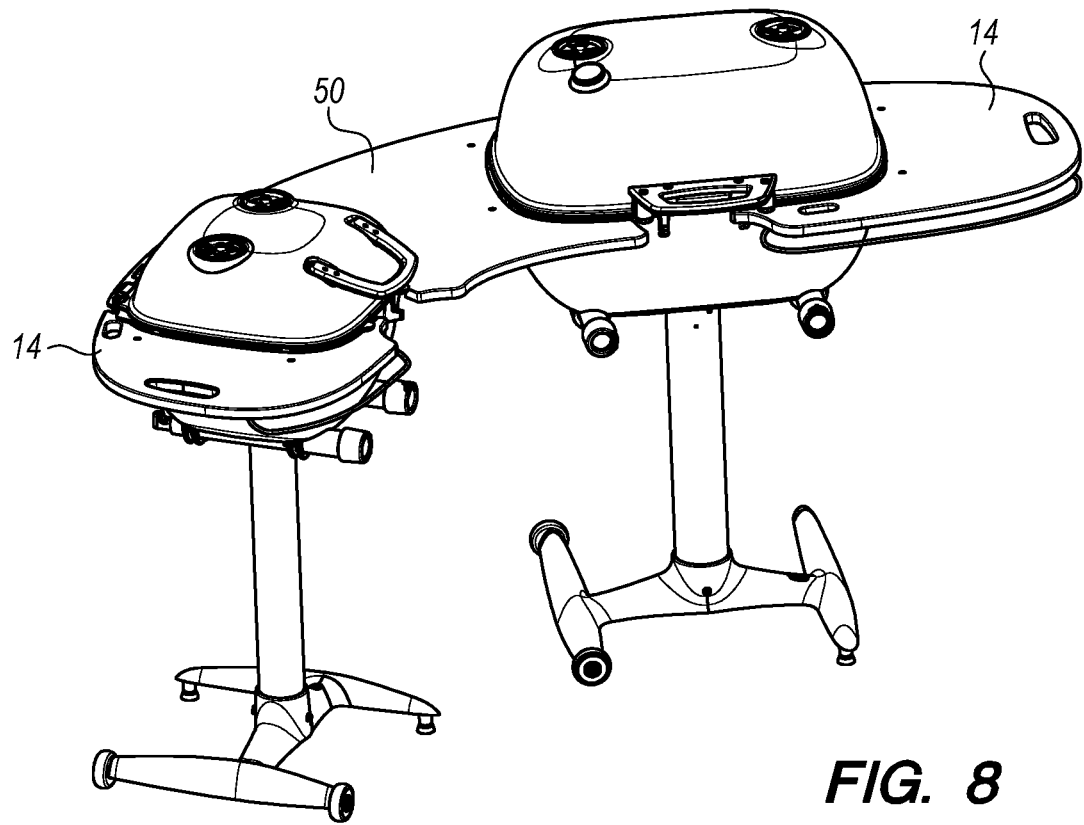
FIG. 8 is a perspective view of an embodiment of the present invention showing two grills linked in a "daisy chain" configuration using shelving components to form an arcuate grilling surface.
Figure 9:
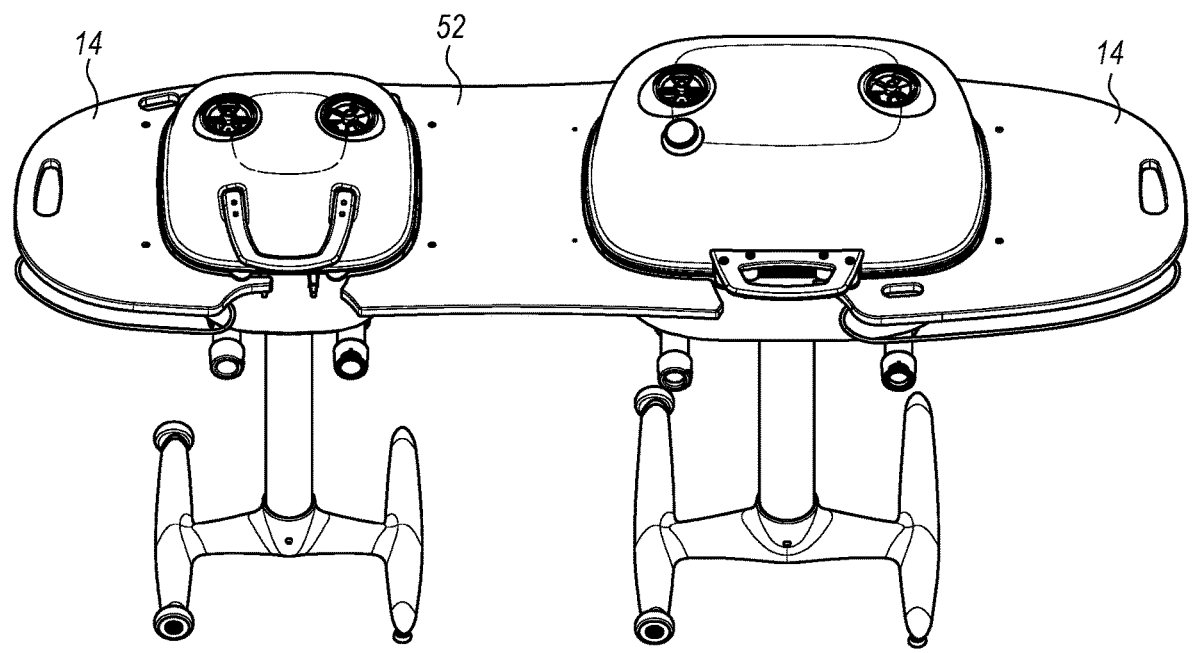
FIG. 9 is a perspective view of an embodiment of the present invention showing two grills linked in a "daisy chain" configuration using shelving components to form a straight grilling surface.

In certain embodiments, multiple grills may be connected in "daisy chain" fashion as shown in FIGS. 8 and 9. In FIG. 8, arcuate shelf connector 50 is used to connect two grills by substituting arcuate shelf connector 50 in place of the standard shelves 14 that would be attached at the adjacent sides of each grill. This configuration is desirable, for example, where the grill is placed in the corner of an outdoor cooking area and two different grills are desired for cooking. Alternatively, as shown in FIG. 9, straight shelf connector 52 may be used when two grills are desired to be placed in horizontal alignment with each other. The best configuration will depend upon the outdoor cooking space available to the user. Since each of shelves 14, arcuate shelf connector 50, and straight shelf connector 52 are easily removable, one or more grills may be reconfigured in many different configurations using these various optional parts, as desired by the user.

Figure 10:
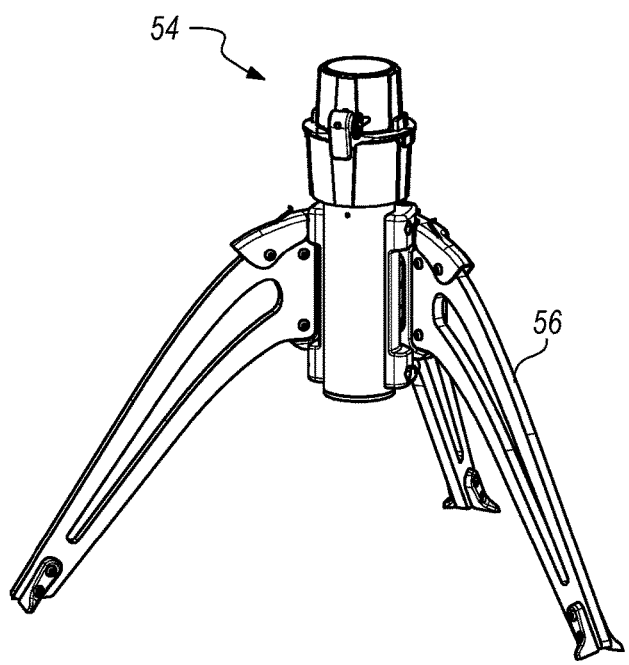
FIG. 10 is a perspective view of a portable grill stand in the unfolded position according to an embodiment of the present invention.
Figure 11:
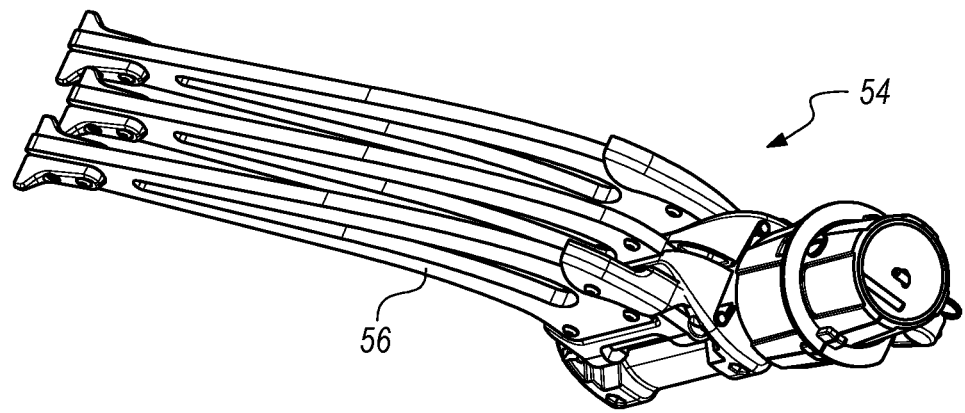
FIG. 11 is a perspective view of a portable grill stand in the folded position according to an embodiment of the present invention.

In certain embodiments, the portability of the grill may be improved by the use of an optional folding stand 54 in place of tubular stand 22, as shown in FIGS. 10 and 11. Each of the folding stand legs 56 of folding stand 54 are hinged such that they fold flat against each other when not in use, as illustrated in FIG. 11. Thus folding stand 54 is desirable for use when the grill will be carried to a different location for use, such as, for example, camping or "tailgating" events. Folding stand 54 is held onto lower grill chamber 12 and locked into place using stand lock 36, just as with tubular stand 22. In other applications, it may be desirable to dispense with the stand entirely, as shown in FIG. 12 where the grill is positioned on a concrete picnic table as are common at many parks. In this configuration, it is the vent tube brackets 30 that provide steady, four-corner support for the grill. As noted earlier, rear stabilizer bars 38 prevent the grill from tipping over when upper grill chamber 10 is pivoted to the open position in this configuration, because rear stabilizer bars 38 extend rearwardly from lower grill chamber 12 and provide a balance point against the weight of upper grill chamber 10 when in the fully opened position.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. When a range is stated herein, the range is intended to include all subranges within the range and all particular points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A grill, comprising:
   a. a lower grill chamber;
   b. an upper grill chamber hinged to the lower grill chamber at a rear edge of the lower grill chamber, wherein the upper grill chamber is configured to close over the lower grill chamber to form an interior cooking chamber;

c. at least one volcano in the lower grill chamber, the at least one volcano comprising an opening; and d. a rigid vent tube rotatably mounted beneath the at least one volcano wherein the vent tube comprises at least one vent tube exit hole positioned at a first point on a side wall of the vent tube facing radially from a longitudinal axis of the vent tube, and a vent tube entry hole positioned through an end of the vent tube coaxially with the longitudinal axis of the vent tube, wherein air is configured to flow from outside the cooking chamber into to the vent tube through the vent tube entry hole, further wherein the vent tube is rotatable to a first position such that the volcano and vent tube exit hole are at least partially aligned to allow air passage from the vent tube into the interior cooking chamber through the vent tube exit hole, and to a second position such that a solid wall positioned at a second point on the side wall of the vent tube is aligned with the volcano to thereby fully block air passage into the interior cooking chamber through the vent tube exit hole.

2. The grill of claim 1, wherein the lower grill chamber further comprises at least one bracket holding the vent tube in position against the lower grill chamber beneath the at least one volcano.

3. The grill of claim 2, further comprising a vent tube grip attached at the end of the vent tube wherein the vent tube grip is thermally insulative.

4. The grill of claim 2, further comprising at least one volcano cover mounted above the at least one volcano in the lower grill chamber.

5. The grill of claim 1, further comprising a tubular stand removably attachable to the lower grill chamber.

6. The grill of claim 5, further comprising a stand lock attaching the tubular stand to the lower grill chamber wherein the stand lock comprises a transverse stand lock pin passing through mating holes in the lower grill chamber and the tubular stand.

7. The grill of claim 6, wherein the tubular stand comprises an H-shaped leg, the H-shaped leg comprising:

a. a single lengthwise member extending beneath the grill in a direction parallel to the rear edge of the lower grill chamber, the single lengthwise member having a first end and a second end; and b. first and second cross members, the first cross member attached at the first end of the lengthwise member, the second cross member attached at the second end of the lengthwise member, and each of the first and second cross members arranged perpendicularly to the lengthwise member, and wherein at least one wheel is attached at each of two opposite points on one of the first and second cross members.

8. The grill of claim 1, wherein a hinge is integrally molded into the upper grill chamber and the lower grill chamber.

9. The grill of claim 1, further comprising a plurality of removable shelves each attachable in a protrusion positioned at a side of the lower grill chamber.

10. The grill of claim 1, further comprising a plurality of rear stabilizer bars attached at the rear edge of the lower grill chamber and extending rearwardly from the lower grill chamber, wherein the plurality of rear stabilizers are each attached at or near a bottom edge of the lower grill chamber and extend to a sufficient length away from the grill that opening of the upper grill chamber hinged to the lower grill chamber will not result in the grill tipping over when the grill is placed on a horizontal surface due to engagement of the plurality of rear stabilizer bars with the horizontal surface.

11. The grill of claim 1, further comprising an ash hole in the lower grill chamber.

12. The grill of claim 11, further comprising an ash hole cover removably attachable at the ash hole in the lower grill chamber wherein the ash hole cover blocks the flow of air into the lower grill chamber through the ash hole.

13. The grill of claim 12, further comprising a frusto-conically shaped ash bucket comprising an opening at the top of the ash bucket of an equal diameter as the ash hole and an ash bucket bottom of a larger diameter than the ash hole.

14. The grill of claim 13, wherein the ash bucket further comprises an ash bucket hangar sized and shaped to be received on one of the plurality of rear stabilizer bars when the ash bucket opening is aligned with the ash hole in the lower grill chamber.

15. The grill of claim 1, further comprising a folding stand removably attachable to the lower grill chamber, wherein the folding stand comprises a plurality of legs hingeably attached to fold flat against each other into a storage position, wherein the plurality of legs extend angularly from a central axis of the folding stand when the plurality of legs are in an open position.

16. The grill of claim 1, further comprising a shelf connector to connect the grill to a second grill, wherein a first end of the shelf connector is removably attached to the grill and a second end of the shelf connector is removably attached to the second grill, thereby creating a shelf surface extending entirely from the grill to the second grill.

17. The grill of claim 1, further comprising a plurality of shelves removably attachable to protrusions positioned in an external surface of the lower grill chamber to form a horizontal work surface at the level of a top rim of the lower grill chamber.

18. The grill of claim 1, further comprising at least one upper vent hole and at least one upper vent plate, wherein the upper vent plate is rotatable to control air flow through the upper vent hole, and thereby control air flow through the grill between the vent tube and at least one upper vent hole.

19. The grill of claim 1, further comprising at least one shelf, wherein the shelf comprises a metal bar for receiving one or more of a pouch, a basket, or other container for holding tools or accessories, wherein the metal bar extends from under the shelf.

20. A grill, comprising:

a. a lower grill chamber having a first end and a second end;

b. an upper grill chamber hinged to the lower grill chamber to form an interior cooking chamber; and c. a first air duct system positioned at the first end of the lower grill chamber and a second air duct system positioned at the second end of the lower grill chamber, each air duct system comprising:

i. an indentation positioned on the lower grill chamber, the indentation extending into the interior cooking chamber;

ii. an air passage positioned on the indention; and iii. a vent tube rotatably mounted beneath the air passage, wherein the vent tube comprises a vent tube exit hole and a vent tube entry hole, wherein the vent tube is configured to rotate to a first position such that the air passage and vent tube exit hole are at least partially aligned to allow air into the interior cooking chamber through the vent tube, and to a second position such that a solid wall positioned at a second point on the vent tube is aligned with the air passage to block air flow into the interior cooking chamber through the vent tube.

\* \* \* \* \*